James C. French's Improvement in Vault Lights
117062     fig 1     PATENTED JUL 18 1871
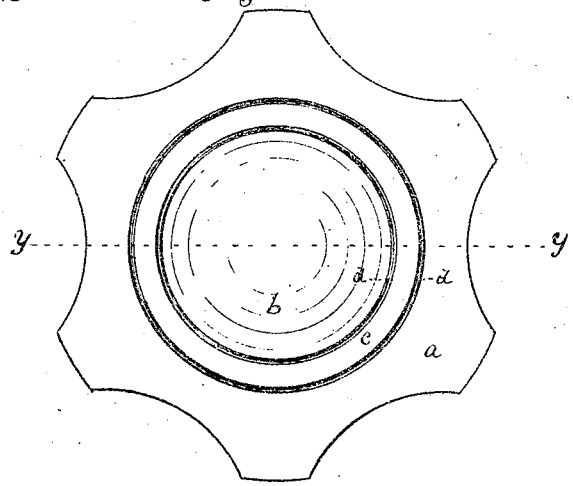
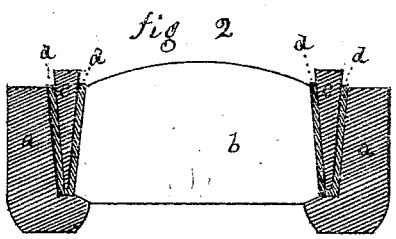
fig 2
Witnesses
Geo. G. Hunt
R. R. French
Inventor
James C. French

UNITED STATES PATENT OFFICE.

JAMES C. FRENCH, OF CHICAGO, ILLINOIS.

IMPROVEMENT IN VAULT-LIGHTS.

Specification forming part of Letters Patent No. 117,062, dated July 18, 1871.

*To all whom it may concern:*

Be it known that I, JAMES C. FRENCH, of Chicago, in the county of Cook and State of Illinois, have invented certain Improvements in Vault-Lights, of which the following is a specification:

The nature and object of my invention relate to an improved method of setting the glass disks or plates in frames for illuminating purposes, more particularly for vaults beneath sidewalks, and other similar purposes, whereby a cheap, durable, and water-tight joint is obtained between said glass disks and the frame thereof.

Figure 1 is a top view of a metallic frame and glass disk, set in position, which embodies my invention. Fig. 2 is a vertical section taken in line $y\,y$, Fig. 1.

$a$ is the metallic frame, in which one or more glass disks or plates may be set. This frame or metallic plate $a$ is most readily and cheaply made of cast-iron, as by using this material the plates may be cast having the apertures or recesses for receiving the glass disks ready for them without further labor; but, if desirable, the said frames or plates may be made of wrought-iron or other suitable material, having the recesses for the glass disks made by boring or other suitable means; but, whatever material they are made from, they must necessarily be made very strong, both to resist the weight to which they are sometimes exposed, and also to resist the pressure from the packing or material composing the setting or bedding of the glass disks. $b$ is a glass disk or plate. This disk or plate may be duplicated to any desired number, limited only by the size of the plate or frames for receiving it or them. This disk is generally made circular with a convex upper surface and plain flat lower one, making a plane convex lens, which by this means more perfectly disseminates the light in the apartment to be illuminated; if desired, however, these disks may be made of other forms. $c$ is a metallic ring, a vertical section thereof, as shown in Fig. 2, representing it as being wedge-formed, having the lower edge the thinnest, and sides slightly diverging from the bottom upward. The recesses in the frame $a$ are made with slightly-sloping sides, nearly corresponding with the slope on the packing-ring $c$. The edges of the glass disks are also made with slightly-sloping edges, so as to nearly correspond with the interior slope of the packing-ring $c$. $d$ is the packing or material from which the water-tight joint is made. This packing is composed of cloth or other fibrous material saturated or coated with paint.

The operation of setting the glass disks is extremely simple, as follows: Having the metallic frame in a firm and solid situation, with the openings for receiving the disks uppermost, the said openings are thoroughly coated internally with paint, a disk is inserted therein, a ring of packing is laid around it, the thin edge of the packing-ring is laid on it, and by means of pressure or concussion the ring is forced into its proper position, carrying with it the packing $d$, which, being slightly elastic and coated with paint, forms a very cheap and durable water-tight joint.

Having thus described my invention, what I claim as new, and desire to secure by Letters Patent, is—

The combination of the packing-ring $c$ and packing $d$ with the frame $a$ and glass disks $b$, when used in the manner and for the purposes hereinbefore specified.

JAMES C. FRENCH.

Witnesses:
GEO. G. HUNT,
R. R. FRENCH.